Sept. 1, 1964 C. A. TOCE 3,147,151
ELECTRIC STORAGE BATTERY AND CASING
Filed Oct. 3, 1958 4 Sheets-Sheet 1

INVENTOR.
Charles A. Toce
BY
HIS ATTORNEY

Sept. 1, 1964 C. A. TOCE 3,147,151
ELECTRIC STORAGE BATTERY AND CASING
Filed Oct. 3, 1958 4 Sheets-Sheet 2

INVENTOR.
Charles A. Toce
BY
HIS ATTORNEY

Sept. 1, 1964 C. A. TOCE 3,147,151
ELECTRIC STORAGE BATTERY AND CASING
Filed Oct. 3, 1958 4 Sheets-Sheet 3

INVENTOR.
Charles A. Toce
BY
HIS ATTORNEY

Sept. 1, 1964     C. A. TOCE     3,147,151
ELECTRIC STORAGE BATTERY AND CASING
Filed Oct. 3, 1958     4 Sheets-Sheet 4
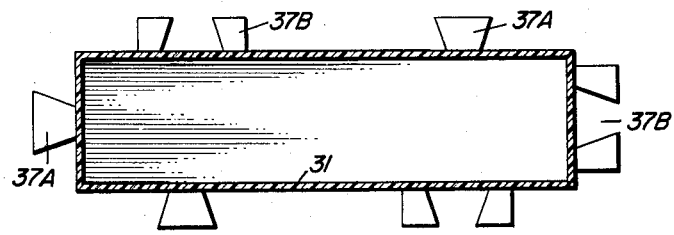
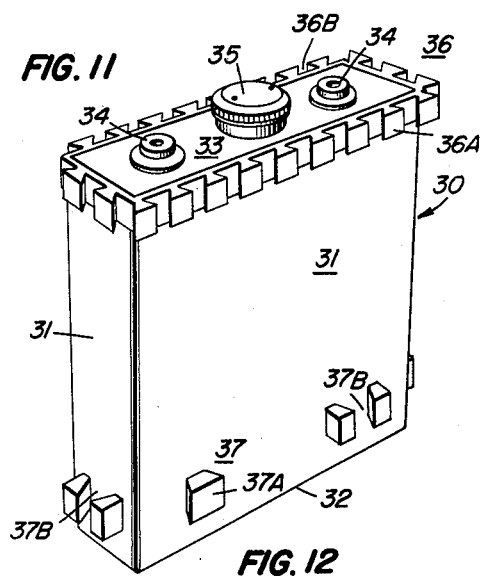
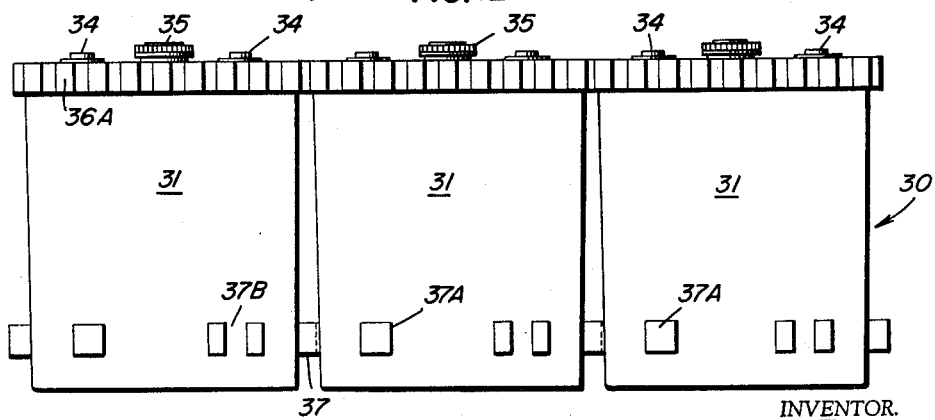
INVENTOR.
Charles A. Toce
BY
HIS ATTORNEY United States Patent Office 3,147,151
Patented Sept. 1, 1964

3,147,151
ELECTRIC STORAGE BATTERY AND CASING
Charles A. Toce, Sunland, Calif., assignor to Electro-Acid Corporation, a corporation of Nevada
Filed Oct. 3, 1958, Ser. No. 765,094
7 Claims. (Cl. 136—166)

My invention relates to electric storage batteries and more particularly concerns the individual electric storage battery casings and the composite battery made up of multiple separate and removably interlocked casings.

An object of my invention is to provide an electric storage battery casing which, simple and compact in itself, of long useful life, and practically foolproof in operation; which casing can be readily and flexibly interlocked with companion and complemental casings in any desired combination, thus providing a storage battery of desired overall dimension, shape, voltage and output rating.

Another object is to provide an electric storage battery formed up of removably-interlocked individual cell casings, which composite battery may have any desired configuration, voltage and output rating and which battery provides important economies in subsequent operation in that defective cells can be readily removed and replaced, without loss of the related and still operable cells of the battery.

All the foregoing, as well as many other highly practicable objects and advantages attend the practice of my invention, which will in part be obvious and in part more fully pointed out hereinafter, during the course of the following description, reference being particularly had to the several sheets of drawings forming part of this application.

Accordingly, my invention may be considered as residing in the several component parts, as well as their essential configuration, in the materials of construction, and in the combination and relation of each of the same with respect to one or more of the others, the scope of the application of all of which is more fully recited in the claims at the end of this disclosure.

In the several views of the drawings, wherein I disclose those several embodiments of my invention which I prefer at present:

FIGS. 1 and 2 disclose in top plan and in side elevation, respectively, a first embodiment of my invention wherein a number of individual storage battery cell casings, illustratively three such casings, are interlocked by dove-tailing, the dove-tailing being applied to each casing near the bottom thereof;

FIG. 3 discloses, on reduced scale and in drop perspective a battery cell from which is made up the composite battery of FIGS. 1 and 2, the plates and the electrolyte both being omitted for clarity, such cell illustratively comprising the casing itself together with a grooved and removable lid and a removable and applied interlocking dove-tail ring;

Figure 3:
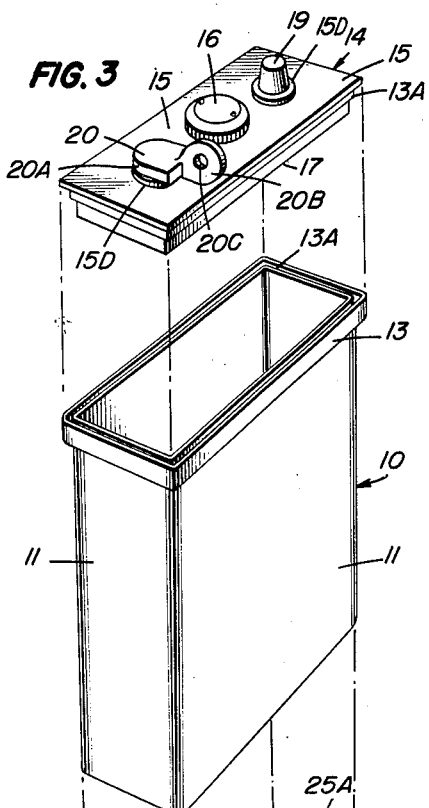
Figure 6:
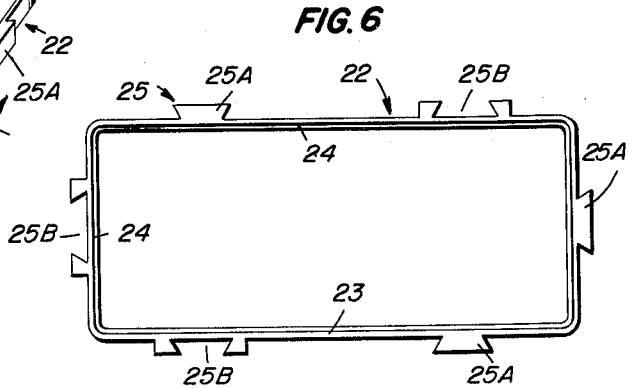
Figure 7:
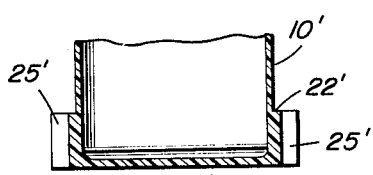
Figure 7:
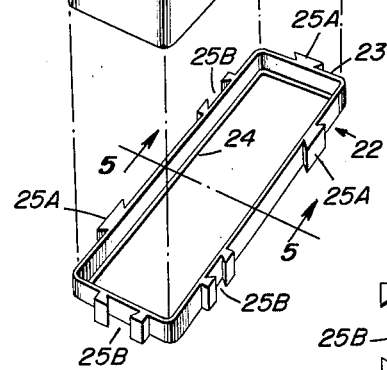
Figure 8:
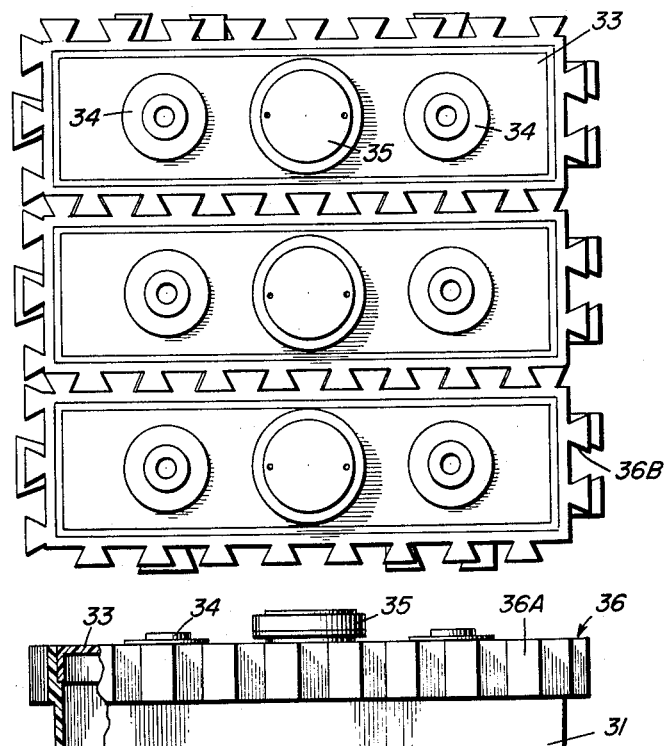
Figure 9:
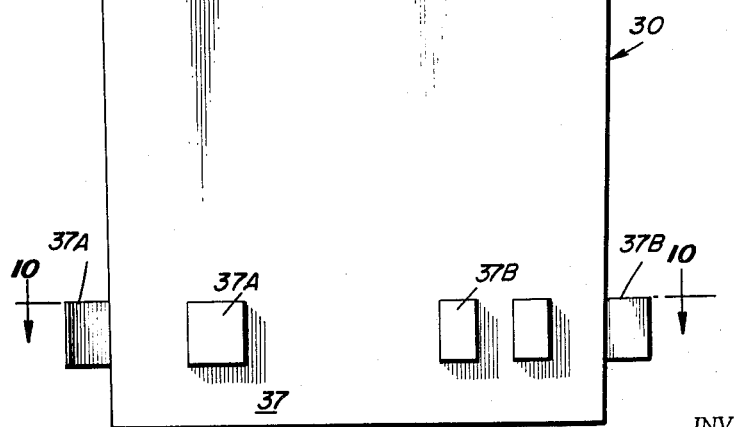

FIG. 6 discloses in top plan, the interlocking ring which is applied to the bottom of each cell casing according to FIG. 3;

FIG. 7 discloses a modified construction of the casing of FIG. 3, wherein the interlocking element is formed directly on each individual casing along the length thereof and illustratively at or near the bottom thereof;

FIGS. 8 and 9 disclose a second embodiment of the composite battery of my invention, in top plan and side elevation, respectively, wherein the component cell casings have interlocking elements formed directly thereon, adjacent both the top and bottom portions thereof;

FIG. 10 is a transverse horizontal section, taken on line 10—10 of FIG. 9, looking in the direction of the arrows;

FIG. 11 discloses in perspective, a complete cell unit according to this second embodiment of my invention; while FIG. 12 illustratively discloses, in side elevation, three cell units according to FIG. 11, removably interlocked together to form the Group 2E type of battery.

Throughout the several views of the drawings, like reference characters denote like structural parts.

As conducive to a more ready understanding of my invention, it may be noted at this point in the disclosure that over a long period of years the cost of producing and marketing electric storage batteries has undergone substantial reduction. Particularly is this true with respect to the batteries intended and adapted for vehicle use. Moreover, importantly increased life expectancy has been imparted thereto. Notwithstanding all of this, however, it is well known that in such batteries a cell failure is frequently, unexpectedly and unpredictably encountered. Also it is well known that when such failure is experienced, the economic complexion is such that repair is not feasible, as by replacing a cell. On the contrary, it is necessary to replace the entire battery. This is so, even though the remaining cells may fully retain normal operating characteristics, themselves having full life expectancy.

In this connection, it is to be noted that a battery of known, accepted and conventional type is made up of a number of interconnected individual cell units. In the early days of the electric storage battery, particularly for automotive use, both the high first cost and replacement cost of these batteries made it feasible, upon failure of one component cell, to open the battery in its entirety and replace the plates and/or electrolyte of the defective cell, or to repair the walls or separators thereof, as may be required. This procedure, however, has not been practical in the present-day battery. The art has long sought a ready, practical and inexpensive way of removing a single defective cell unit and replacing it with new unit without disturbing the related cell units and without disturbing the composite battery.

Another problem perplexing the industry is the comparative inflexibility of the known batteries. Heretofore, it has been necessary for a dealer in batteries to stock some 8 or 10 sizes and shapes of batteries. The batteries are usually of either six- or twelve-volt construction, comprised of three or six cells respectively in differing cell arrangement (side-by-side or end-to-end or combinations thereof) and differing capacities. In each such instance, regardless of number of component cells or electrical rating of the resulting battery, all of these cells are inflexibly integrated together from the outset, during manufacture, in permanent relationship. This imposes a problem of stocking a large number of batteries with resultant big inventory and slow turnover. Moreover, it has been necessary to produce and stockpile batteries of all conventional types, thus appreciably increasing investment in capital, operating costs and storage facilities required.

An important object of my invention is to provide separate and removably interlocking electric storage battery cell units. Also to provide a composite battery made up of such units interlocked together, wherein the interlocking elements are readily applied to the battery casing, giving rise to firm and positive interlock, while permitting ready removal of individual cells as and when required, and facilitating the build-up in custom jobbing, of composite storage batteries in desired configuration, dimensioning and output rating, both as to voltage and current.

And now having reference to the practice of my invention, attention is directed to FIGS. 1 through 6 of the accompanying drawings. It will be seen that I provide a cell casing, indicated generally at 10 in FIG. 3, which is generally rectangular in transverse cross-section. Formed of plastic or other suitable material, it is comprised of slightly tapered side walls 11 and a bottom 12 (FIG. 2), all molded as an integral and one-piece unit.

Casing 10 is open at its top end. In conventional manner I form flange 13 on this open, top end of casing 10. And I provide a channel or groove 13A therein, which is disposed vertically in and extending completely about the top surface of the flange. This groove is adapted to cooperate with and to receive an interlocking annular ridge which I form on the related lid for the cell casing 10.

Figure 4:
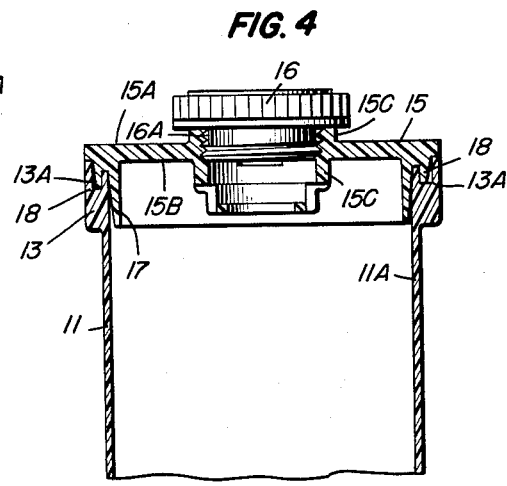
FIG. 4 is a fragmentary, transverse and vertical section through an individual battery cell casing, taken on the line 4—4 of FIG. 1 and looking in the direction of the arrows.
Figure 5:
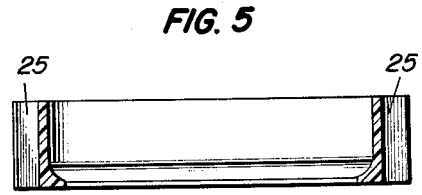
FIG. 5 is a transverse vertical section similarly taken on the line 5—5 of FIG. 3, through a ring with included dove-tailing, which illustratively is applied to the bottom of each casing of the battery according to FIGS. 1 and 2, and which ring is more fully disclosed in FIG. 3.

The lid noted, indicated generally at 14 in the drawings, serves to close the casing 10 at its top, open end. As is evident from a consideration of FIGS. 3 and 4, the lid 14 is generally rectangular and comprises a flat body portion 14 having a top surface 15A and a bottom surface 15B (FIG. 4). Lid 14 is formed, as by molding or other suitable method of production, from plastic or generally similar and known material.

I prefer to provide apertures 15D to accommodate the terminal posts 19 in lid 14. And centrally of the lid, and usually forming the same during the course of a molding, I provide a boss 15C. The boss serves as a filler neck for the cell 10. To that end, it extends outwardly from both top surface 15A and bottom surface 15B of the body portion 15 of lid 14. Boss 15C comprises an entrance port for the electrolyte for the battery. It is complemental to and cooperates with a related and conventional filler cap 16. I form the filler cap of suitable and readily available materials, of which plastic is typical. As shown in 16A I resort to conventional threading to provide removable engagement of filler cap 16 within boss 15C.

From the underside 15A of lid 14, and shortly inwardly of the outer edges of this lid, I strike, as by molding or the like, a downwardly depending flange or skirt 17. This skirt 17 cooperates with, and near its base abuts against the inner surface 11A of sidewalls 11 of casing 10. Moreover, I similarly strike down a ridge 18 from the undersurface 15B of lid 14. I provide this ridge short of the outer extremity of lid 14, but outwardly of the skirt 17, previously described. The orientation of this interlocking ridge, as well as its dimensioning, is such that it snugly engages and interlocks within the groove 13A which I provide in flange 13 at the top of casing 10.

It will be seen that after introduction of the battery plates, not shown, lid 14 is positioned over the open top of casing 10 and dropped into place. I then prefer to seal the lid in desired manner. I then back off filler cap 16, and fill cell 10 with conventional electrolyte.

Terminal post 19 is disclosed in FIG. 3 protruding from the top of the lid 14, for reception of a related conductor strap. In generally similar manner, the second terminal post of cell unit disclosed in FIG. 3 has applied thereto a lug 20, comprising one half of a composite conductor strap. This lug comprises a plate 20A made fast to the terminal post. The plate has formed thereon an outwardly projecting lug 20B, turned for orientation into a vertical plane. Lug 20B takes generally the form of an eye, and has a bolt-receiving opening provided centrally therein, as at 20C.

Figure 1:
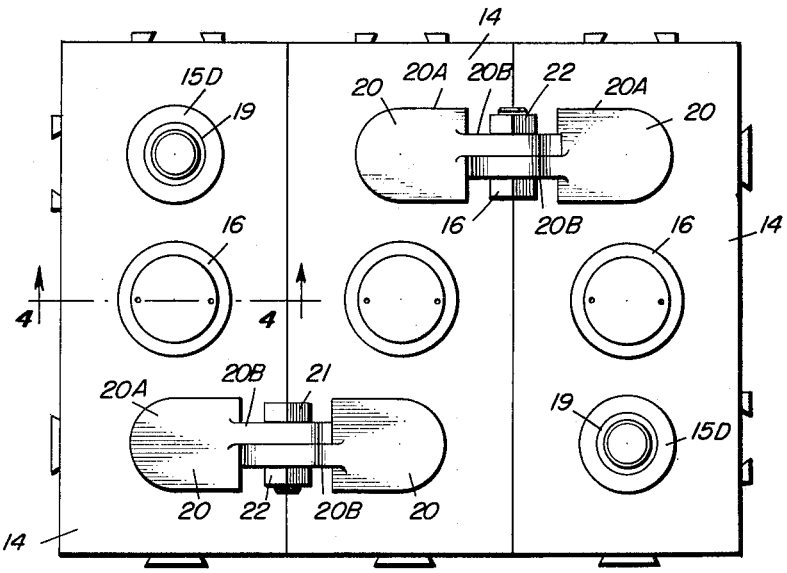
Figure 2:
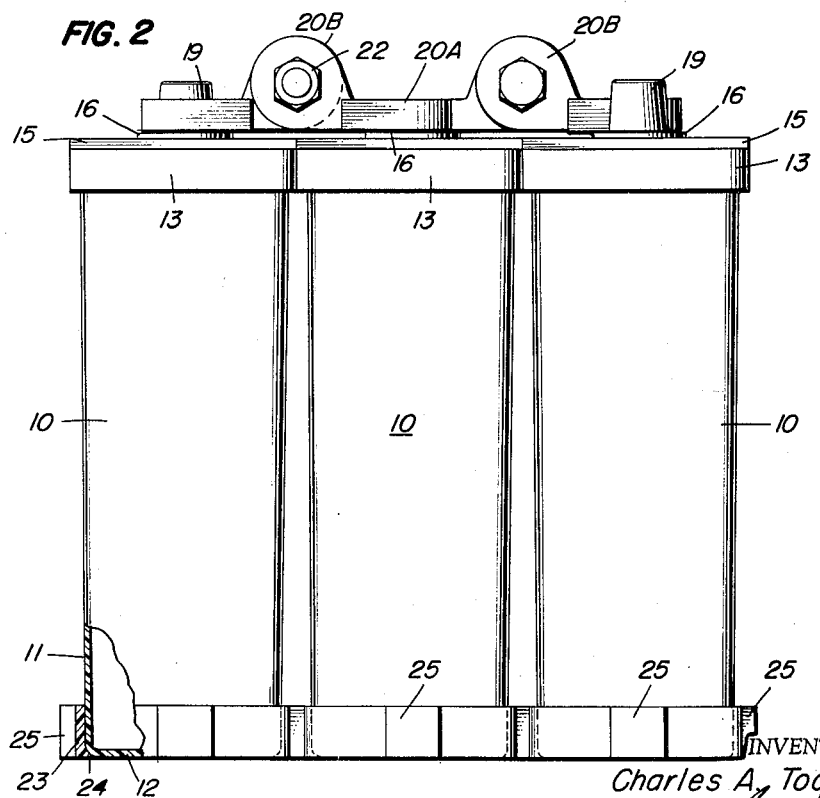

When a composite battery assembly is made up from a plurality of cell units according to FIG. 3, (a six-volt battery of conventional Group I type being conveniently illustrated in FIGS. 1 and 2 with characteristic fat or squat appearance), the lugs 20B of related plates 20A are overlapped in side-by-side relationship so that headed and threaded bolts 21 may be applied through the cooperating and overlapping eyelets 20C of these lugs. The bolts 21 secure related lugs 20B, 20B removably fast to each other in desired suitable manner, as by cooperating nuts 22.

As best seen in FIGS. 2, 3, 5 and 6, I provide for removable interlocking engagement between related and adjacent casings 10, through the provision of suitable engaging and locking elements. Illustratively, I provide a separate locking ring, one on each of the cell casings 10. While the interlocking elements may be provided at any suitable point along the vertical extent of the sidewalls 11 of casing 10, and may be secured to the casing in any suitable manner, as by molding or otherwise, I prefer to form the same as rings which are separate and apart from the cell casing 10, and which I apply to each such casing at the bottom thereof. These rings thus comprise elements in which casings 10 are removably seated.

Typically, such a ring is indicated generally at 22 in FIG. 3. Ring 22 comprises an upstanding wall 23 which preferably extends completely around the casing 10. This ring 22 is conveniently open at the bottom. And preferably it is provided with an inturned, horizontally extending flange 24 at the bottom thereof. Flange 24 provides a seat for the casing 10 at the bottom thereof, wall 23 of ring 22 serving to retain and position the casing 10 in the ring 22. Ring 22 is applied to the casing 10 in any desirable manner, as by cementing, friction fit, or the like.

So that the casing 10 may be secured in any desired manner to generally like and related cell casings, I provide an interlock on at least certain faces of the sidewalls 23 of the ring 22. In this manner, it is made possible to interlock companion casings 10 in end-to-end manner, at either end thereof, or in side-by-side relationship, at either side thereof. As shown, I provide such interlocking elements on each side wall 23. Where it is desired, however, it is entirely within the scope of my invention to eliminate the interlock at any end or side of the ring 22.

It is of course apparent that the interlock can be formed or applied continuously about the entire extent of ring 22. I find it sufficient, however, for all practical purposes, simply to spot such interlock at fixed locations along the extent of ring 22. Preferably, the interlock is in the form of butterfly dovetailing, indicated generally at 25, wherein a protruding element 25A is spotted at a selected point along the length of one side 23 of the ring 22. And opposite this selected point I dispose a complemental and related recessed element 25B along the companion ring 23.

Again having reference of FIG. 6, this time with attention particularly directed to the horizontal sides 23 of ring 22, and directing attention to the right-hand portions of these horizontal sides 23, it will be seen that on the top one of these two parallel sides 23 I provide a recessed element 25B. Conversely, on the side opposite thereto, i.e., on bottom side 23, I provide a complemental and projecting element 25A. Similarly, male element 25A is centrally disposed at one end of the ring 22, while complemental recessed element 25B is centrally provided at the other end thereof. These dovetail interlock elements 25A, 25B may be applied to ring 22 in any suitable manner, as by being die-cast or otherwise struck therefrom.

In the embodiment disclosed in FIG. 7, the casing 10' has ring 22' integrally formed thereon, rather than applied thereto. In this embodiment ring 22' is molded along with casing 10' as the latter is being formed. Similarly, the dovetailing elements 25' are formed integrally with ring and casing during the molding process.

It is apparent from a consideration of the foregoing that it is a matter of but a few moments to assemble a battery from the cell units which I have described. Typically, a short, squat and fat conventional Group I assembly may be made up, as shown in FIGS. 1 and 2. Alternatively, the narrow, elongated assembly of Group 2E may be made as shown in FIG. 12. Where desired, any variant of these basic assemblies may be adopted. In any such instance, the units 10 are removably interlocked together through sliding the projecting elements 25A into the companion and recessed elements 25B of adjacent cell casings 10, 10. This interlock, in its first embodiment, is conveniently provided at the bottom of these cell units. At their tops, these cell units are secured together by related and overlapping lugs 20B, 20B. These latter are locked down through application of bolts 21 and nuts 22.

The assembled battery is now ready for use as a source of electrical energy, simply through connection of the terminals 19, 19 to the related circuitry.

When it is necessary to dismantle the battery assembly, as for example, upon failure of one of the individual cells 10, it is a matter of but a moment to back off the nuts 22 and remove bolts 21, thus freeing the cells at the top thereof, and then removably slide out, through vertical lift, the particular casing 10 with defective cell to be replaced. Upon replacement of the cell thus removed with a fresh cell, and upon rebolting at the top of the cells, the composite battery is again conditioned for service. The serviceable cells are subjected to no appreciable disturbance.

In the first embodiment which has just been disclosed the interlock, through the use of dovetailing, is provided only at the bottom of the cells, reliance being placed upon the connector straps to removably secure together the separate cells at the tops thereof. In the embodiment disclosed in FIGS. 8 thorugh 12, however, this interlock is provided at both the top and bottom of each cell, the dovetailing being continuous at the top of the cell casings 10 while the applied dovetailing is intermittently provided near the bottom of the cells 10 on such walls of the cell as may be provided with interlocking means all in manner generally akin to the provision of such dovetailing on the rings 22 employed in the first embodiment. It is to be understood, of course, that it is within the scope of my invention to have the dovetailing spotted around the top of the casings 10, just as shown at the bottom thereof in FIG. 9, for example. Alternatively, it is contemplated to apply continuous dovetailing near the bottom of these casings 10, in manner akin to that shown at the top of these units.

In the second illustrative embodiment, as perhaps best seen in FIG. 9, I provide a cell casing which I indicate generally at 30. This casing has vertical sides 31, bottom 32 and casing lid 33. As shown in FIG. 8, each such lid 33 has paired terminals 34 and filler cap 35.

Butterfly dovetailing 36 illustratively is applied completely about such sides 31 of the casing 30, near the top thereof. Projecting elements 36A extend outwardly, while complemental recesses 36B are formed between adjacent elements 36A. The dovetailing 36 is formed on or applied to casing 30 in any desired suitable manner, as by molding. The dovetailing elements are usually and preferably formed of the same material as the casing 30 itself and along with the forming of the casing.

Generally similar dovetailing 37 is preferably spotted along sides 31 of casing 30 near to but short of the bottom thereof as perhaps best seen in FIG. 10. Here the projecting elements 37A extend outwardly at selected points along the sides and ends of casing 30, while diametrically opposite thereto I provide a related element of complemental recessed, indicated generally at 37B. The dovetail elements provided at the bottom of the casing are formed of any suitable material and applied in any suitable manner, all as fully described with respect both to the dovetail elements of the first embodiment and those applied at the upper part of the casing 30 in the present embodiment. It is to be noted that this point that the lower dovetailing 37 extends outwardly from the related side wall 31 of casing 30 to an extent greater than upper dovetailing 36, thereby to facilitate application to and removal from adjacent casings 30.

To assemble the separate units 30 into a composite battery of desired voltage and current characteristics, I slide the units 30 through vertical planes relative to each other in order to achieve butterfly dovetailing interlock at both top and bottom of these casings. An interlock of greater security is achieved in this second embodiment, particularly at the top thereof, than that obtained in the first embodiment. When I seek to remove any particular cell as upon its failure or the like. I simply slide that unit upwardly and out of its interlock with related cells, just as in the case of the embodiment first described. The battery is thereupon fitted with a replacement cell unit and is then ready for continued service.

As shown in FIG. 12, three like cells 30 may be assembled together in end-to-end relationship, thus providing the long and narrow battery of the Group 2E type. These units, of course, may be assembled in any other desired configuration or arrangement, as well as voltage and current output, as may be selected.

It is apparent from the foregoing that I provide in my invention substantial flexibility in electric storage battery construction. The individual cells, employing the novel casing of my invention, are readily and simply formed in themselves. The cases are of simple configuration and low in cost of production. They are fashioned through the use of production techniques which similarly are themselves simple and economical. These cells, thus fabricated, may be readily and removably interlocked at both the top and bottom thereof or at either top or bottom. Dovetailing may be provided, as desired, on one, two or more sides or faces of the cell casing. Through the use of my new construction the battery assembly, formed of such units, is subject to ready replacement of a defective cell. It is equally subject to placing cells in any desired configuration.

The dovetailing or similar interlock may be applied directly to the cell casings, or may be formed integrally therewith. For convenience in claiming, I employ the term "applied to the cell casing" as indicative of either forming on, securing to, or otherwise supplying interlock to the cell unit as by ring or the like.

An important advantage of my invention is that the manufacturer need tool up for the production of only a single cell casing, this together with the limited components of the cell unit which are required. Using the conventional dry-charge construction now popularly accepted, the manufacturer can stockpile the electrolyte-free cell in substantial quantities. From this stockpile he can, as and when required, supply his jobbers and distributors with batteries of desired size, shape and output rating all at minimum cost. Or he can supply the jobbers and distributors with cells for their assembly into storage batteries of desired specification.

Similarly, the jobber and distributor is required to only stockpile one type of cell. Three, six or other number of these cells are assembled into a composite battery of desired configuration and electric rating. All this is achieved readily and at will. The same cell units may be employed for replacement purposes, as and when required.

And as a further advantage of my invention, it is noted that an air-space is provided between adjacent cell casings, this assuring ventilation or air-wash between cells and efficient cooling action.

All the foregoing, as well as many other highly important and practical advantages attend the practice of my invention.

It is apparent from the foregoing that once the broad aspects of my invention are disclosed, many embodiments thereof will readily occur to those skilled in the art, as well as many modifications of the embodiments here disclosed. Accordingly, I intend the foregoing disclosure to be considered as purely illustrative, and not as a limitation.

I claim as my invention:

1. A composite electric storage battery comprising a plurality of removably interlocking individual cell casings, the said interlock being comprised of a narrow ring of elements about each of the said individual casings and projecting outwardly therefrom for interlock with corresponding rings of adjacent casings to space said casings apart throughout the width and length of the same and provide substantial air-space therebetween for air-wash.

2. A composite battery assembly comprised of a plurality of separate and like cooperating cell casings, each of rectangular cross-section and provided with a narrow ring of dovetailing projecting outwardly from the four sides thereof to removably interlock adjacent cell casings with substantial air-space therebetween for air-wash.

3. A composite electric storage battery comprising a plurality of separate cell casings, each provided with removably projecting interlocking means at the bottom thereof to lock adjacent cell casings together at the cell bottom, and battery straps at the top serving to interlock the casings together at the tops thereof to space the cells apart and provide substantial air-space between casings throughout the width and length of the same.

4. A composite electric storage battery made up of removably interlocking individual cell casings, the said interlock being comprised of dovetailing interlocking elements provided near the bottom only of each said casing and projecting outwardly therefrom, and of conductor straps applied to the terminals of the adjacent casings at the tops thereof for interlock with corresponding elements of an adjacent casing and providing substantial air-space therebetween for air-wash.

5. In combination, a storage battery comprising a plurality of adjacent cells, each having a casing provided with a channel portion around the top edge thereof, a cooperating lid with an annular ridge on the underside thereof interengaging the channel portion of said casing, conductor straps applied to the terminals of adjacent cells, and dovetail ring means provided on each casing and projecting outwardly therefrom for engaging in locking relation with an adjacent casing while maintaining the casings apart with substantial air-space therebetween.

6. A casing for an electric storage battery cell having interlocking dovetailing provided adjacent the bottom only of the selected sides thereof and projecting outwardly therefrom for engagement with corresponding interlocking means of an adjacent cell for maintaining interlocking relation with adjacent cell and sides spaced apart with substantial air-space therebetween.

7. In combination, a storage battery cell casing, and a separate ring having externally projecting interlocking elements and inturned flange provided thereon and fitted to the casing at the bottom thereof.

References Cited in the file of this patent

UNITED STATES PATENTS

| | | |
|---|---|---|
| 1,152,246 | Walker | Aug. 31, 1915 |
| 2,027,262 | Allen | Jan. 7, 1936 |
| 2,886,622 | Shannon | May 12, 1959 |

FOREIGN PATENTS

| | | |
|---|---|---|
| 1,076,430 | France | Oct. 26, 1954 |